(12) United States Patent
Gaddam et al.

(10) Patent No.: US 12,321,926 B2
(45) Date of Patent: *Jun. 3, 2025

(54) SYSTEM, METHOD, AND COMPUTER PROGRAM PRODUCT FOR AUTHENTICATING A USER FOR A TRANSACTION

(71) Applicant: Visa International Service Association, San Francisco, CA (US)

(72) Inventors: Sivanarayana Gaddam, Santa Clara, CA (US); Bryan Carroll, Livermore, CA (US)

(73) Assignee: Visa International Service Association, San Francisco, CA (US)

( * ) Notice: Subject to any disclaimer, the term of this patent is extended or adjusted under 35 U.S.C. 154(b) by 70 days.

This patent is subject to a terminal disclaimer.

(21) Appl. No.: 17/739,326

(22) Filed: May 9, 2022

(65) Prior Publication Data
US 2022/0261792 A1   Aug. 18, 2022

Related U.S. Application Data

(63) Continuation of application No. 16/540,230, filed on Aug. 14, 2019, now Pat. No. 11,354,652.

(51) Int. Cl.
*H04L 9/08* (2006.01)
*G06Q 20/36* (2012.01)
*G06Q 20/38* (2012.01)
*H04L 9/40* (2022.01)

(52) U.S. Cl.
CPC ..... *G06Q 20/3678* (2013.01); *G06Q 20/3829* (2013.01); *H04L 9/0861* (2013.01);
(Continued)

(58) Field of Classification Search
CPC ..... G06Q 20/322; G06Q 20/34; H04L 9/3073
See application file for complete search history.

(56) References Cited

U.S. PATENT DOCUMENTS 5,761,311 A   6/1998   Spelman et al.
6,240,187 B1  5/2001   Lewis
(Continued)

FOREIGN PATENT DOCUMENTS

CA   2395019 A1    6/2001
CN   104182876 A  12/2014
(Continued)

OTHER PUBLICATIONS

Kong et al., "A secure and Privacy-preserving Incentive Framework for Vehicular Cloud", IEEE Global Communications Conference, 2018.

(Continued)

*Primary Examiner* — Saba Dagnew
(74) *Attorney, Agent, or Firm* — The Webb Law Firm

(57) ABSTRACT

A system, method, and computer program product for authenticating a user for a transaction; generate an electronic wallet key pair including an electronic wallet public key and a corresponding electronic wallet secret key, the electronic wallet key pair associated with an electronic wallet transaction processing system; receive a payment gateway public key corresponding to a payment gateway secret key, the payment gateway public key and the payment gateway secret key associated with a payment gateway system; generate a public re-encryption key based on the payment gateway public key; communicate, to the payment gateway system, the public re-encryption key; receive or determine encrypted transaction data associated with a transaction, the encrypted transaction data including an account identifier encrypted with the electronic wallet public key; re-encrypt the encrypted transaction data with the public re-encryption key; and communicate, to the payment gateway system, the re-encrypted transaction data.

15 Claims, 6 Drawing Sheets

(52) U.S. Cl.
CPC ........ *H04L 63/0442* (2013.01); *H04L 63/083* (2013.01); *G06Q 2220/00* (2013.01); *H04L 2209/56* (2013.01)

(56) References Cited

U.S. PATENT DOCUMENTS

| | | | |
|---|---|---|---|
| 10,430,839 | B2 | 10/2019 | Jacobson |
| 10,805,084 | B1 | 10/2020 | Munson et al. |
| 2008/0059787 | A1* | 3/2008 | Hohenberger ........ H04L 9/3073 713/153 |
| 2011/0137802 | A1 | 6/2011 | Spies et al. |
| 2012/0150750 | A1* | 6/2012 | Law ........................ H04L 67/02 705/76 |
| 2015/0019443 | A1* | 1/2015 | Sheets ................ G06Q 20/3829 705/71 |
| 2015/0052064 | A1 | 2/2015 | Karpenko et al. |
| 2015/0088756 | A1* | 3/2015 | Makhotin .............. G06Q 20/12 705/71 |
| 2017/0200155 | A1* | 7/2017 | Fourez ................... G06Q 20/34 |
| 2017/0272240 | A1 | 9/2017 | Bar-El et al. |
| 2018/0005238 | A1 | 6/2018 | Hammad et al. |
| 2021/0182423 | A1 | 6/2021 | Padmanabhan |

FOREIGN PATENT DOCUMENTS

| | | |
|---|---|---|
| CN | 105684010 A | 6/2016 |
| CN | 106712946 A | 5/2017 |
| CN | 109802947 A | 5/2019 |
| CN | 109919604 A | 6/2019 |
| CN | 111698192 A | 9/2020 |
| WO | 0163444 A2 | 8/2001 |
| WO | 2014118589 A1 | 8/2014 |
| WO | 2020168545 A1 | 8/2020 |
| WO | 2020222777 A1 | 11/2020 |

OTHER PUBLICATIONS

Ateniese, et al., "Improved Proxy Re-Encryption Schemes with Applications to Secure Distributed Storage", The 12th Annual Network and Distributed System Security Symposium, 2005, pp. 1-25.
Hohenberger, "Lecture 17: Re-encryption", 2007.
"Identity-based conditional proxy re-encryption", Wikipedia, 2022.
"Proxy re-encryption", Wikipedia, 2022.
"2009_Book_TopicsInCryptologyCT-RSA2009", 2009.

* cited by examiner

SYSTEM, METHOD, AND COMPUTER PROGRAM PRODUCT FOR AUTHENTICATING A USER FOR A TRANSACTION

CROSS-REFERENCE TO RELATED APPLICATION

This application is a continuation of U.S. patent application Ser. No. 16/540,230 filed, Aug. 14, 2019, the disclosure of which is hereby incorporated by reference in its entirety.

BACKGROUND

1. Field

This disclosure relates generally to systems, devices, products, apparatus, and methods for user authentication, and in some embodiments or aspects, to a method, a system, and a product for authenticating a user for a transaction using re-encryption.

2. Technical Considerations

Data flow loop problems may occur when two parties share data via an untrusted intermediary. For example, authentication of a user for a transaction conducted via an electronic wallet transaction processing system may suffer from a data flow loop problem, because the electronic wallet transaction processing system may send data to a payment gateway via a merchant system. As an example, a consumer using an electronic wallet to conduct a transaction may experience increased transaction processing time (e.g., increased checkout time, etc.). Further, payment gateways and electronic wallets may suffer from integration burden and operational overhead that may inhibit user authentication and/or further increase transaction processing time. Accordingly, there is a need for improved user authentication for transactions.

SUMMARY

Accordingly, provided are improved systems, devices, products, apparatus, and/or methods for authenticating a user for a transaction.

According to some non-limiting embodiments or aspects, provided is a computer-implemented method including: generating, with an electronic wallet transaction processing system, an electronic wallet key pair including an electronic wallet public key and a corresponding electronic wallet secret key, the electronic wallet key pair associated with the electronic wallet transaction processing system; receiving, with the electronic wallet transaction processing system, a payment gateway public key corresponding to a payment gateway secret key, the payment gateway public key and the payment gateway secret key associated with a payment gateway system; generating, with the electronic wallet transaction processing system, a public re-encryption key based on the payment gateway public key; communicating, from the electronic wallet transaction processing system to the payment gateway system, the public re-encryption key; receiving or determining, with the electronic wallet transaction processing system, encrypted transaction data associated with a transaction, the encrypted transaction data including an account identifier encrypted with the electronic wallet public key; re-encrypting, with the electronic wallet transaction processing system, the encrypted transaction data with the public re-encryption key; and communicating, from the electronic wallet transaction processing system to the payment gateway system, the re-encrypted transaction data.

In some non-limiting embodiments or aspects, the method further includes: receiving, with the electronic wallet transaction processing system, user credentials associated with a user for the transaction; and authenticating, with the electronic wallet transaction processing system, the user for the transaction based on the user credentials, wherein authenticating the user for the transaction includes re-encrypting the encrypted transaction data with the public re-encryption key and communicating the re-encrypted transaction data to the payment gateway system.

In some non-limiting embodiments or aspects, the electronic wallet transaction processing system authenticates the user for the transaction based on the user credentials without decrypting the encrypted transaction data including the account identifier encrypted with the electronic wallet public key.

In some non-limiting embodiments or aspects, the method further includes: storing, with the electronic wallet transaction processing system in an in-memory database, the account identifier encrypted with the electronic wallet public key in association with the user credentials.

In some non-limiting embodiments or aspects, the electronic wallet transaction processing system communicates the re-encrypted transaction data to the payment gateway system via a merchant system.

In some non-limiting embodiments or aspects, the electronic wallet transaction processing system receives the user credentials associated with the user for the transaction from the merchant system.

In some non-limiting embodiments or aspects, the method further includes: receiving, with the payment gateway system, the re-encrypted transaction data; decrypting, with the payment gateway system, the re-encrypted transaction data based at least partially on the payment gateway secret key; and identifying, with the payment gateway, the account identifier.

According to some non-limiting embodiments or aspects, provided is a system including: an electronic wallet transaction processing system including one or more processors programmed and/or configured to: generate an electronic wallet key pair including an electronic wallet public key and a corresponding electronic wallet secret key, the electronic wallet key pair associated with the electronic wallet transaction processing system; receive a payment gateway public key corresponding to a payment gateway secret key, the payment gateway public key and the payment gateway secret key associated with a payment gateway system; generate a public re-encryption key based on the payment gateway public key; communicate, to the payment gateway system, the public re-encryption key; receive or determine encrypted transaction data associated with a transaction, the encrypted transaction data including an account identifier encrypted with the electronic wallet public key; re-encrypt the encrypted transaction data with the public re-encryption key; and communicate, to the payment gateway system, the re-encrypted transaction data.

In some non-limiting embodiments or aspects, the electronic wallet transaction processing system including the one or more processors is further programmed and/or configured to: receive user credentials associated with a user for the transaction; and authenticate the user for the transaction based on the user credentials, wherein authenticating the user for the transaction includes re-encrypting the encrypted transaction data with the public re-encryption key and communicating the re-encrypted transaction data to the payment gateway system.

In some non-limiting embodiments or aspects, the electronic wallet transaction processing system including the one or more processors authenticates the user for the transaction based on the user credentials without decrypting the encrypted transaction data including the account identifier encrypted with the electronic wallet public key.

In some non-limiting embodiments or aspects, the electronic wallet transaction processing system including the one or more processors is further programmed and/or configured to: store, in an in-memory database, the account identifier encrypted with the electronic wallet public key in association with the user credentials.

In some non-limiting embodiments or aspects, the electronic wallet transaction processing system including the one or more processors communicates the re-encrypted transaction data to the payment gateway system via a merchant system.

In some non-limiting embodiments or aspects, the electronic wallet transaction processing system including the one or more processors receives the user credentials associated with the user for the transaction from the merchant system.

In some non-limiting embodiments or aspects, the system further includes: the payment gateway system including one or more processors programmed and/or configured to: receive the re-encrypted transaction data; decrypt the re-encrypted transaction data based at least partially on the payment gateway secret key; and identify the account identifier.

According to some non-limiting embodiments or aspects, a computer program product including at least one non-transitory computer-readable medium including program instructions that, when executed by at least one processor, cause the at least one processor to: generate an electronic wallet key pair including an electronic wallet public key and a corresponding electronic wallet secret key, the electronic wallet key pair associated with the electronic wallet transaction processing system; receive a payment gateway public key corresponding to a payment gateway secret key, the payment gateway public key and the payment gateway secret key associated with a payment gateway system; generate a public re-encryption key based on the payment gateway public key; communicate, to the payment gateway system, the public re-encryption key; receive or determine encrypted transaction data associated with a transaction, the encrypted transaction data including an account identifier encrypted with the electronic wallet public key; re-encrypt the encrypted transaction data with the public re-encryption key; and communicate, to the payment gateway system, the re-encrypted transaction data.

In some non-limiting embodiments or aspects, the instructions further cause the at least one processor to: receive user credentials associated with a user for the transaction; and authenticate the user for the transaction based on the user credentials, wherein authenticating the user for the transaction includes re-encrypting the encrypted transaction data with the public re-encryption key and communicating the re-encrypted transaction data to the payment gateway system.

In some non-limiting embodiments or aspects, the instructions cause the at least one processor to authenticate the user for the transaction based on the user credentials without decrypting the encrypted transaction data including the account identifier encrypted with the electronic wallet public key.

In some non-limiting embodiments or aspects, the instructions further cause the at least one processor to: store, in an in-memory database, the account identifier encrypted with the electronic wallet public key in association with the user credentials.

In some non-limiting embodiments or aspects, the instructions cause the at least one processor to: communicate the re-encrypted transaction data to the payment gateway system via a merchant system; and receive the user credentials associated with the user for the transaction from the merchant system.

In some non-limiting embodiments or aspects, the instructions further cause the at least one processor to: receive the re-encrypted transaction data; decrypt the re-encrypted transaction data based at least partially on the payment gateway secret key; and identify the account identifier.

Further embodiments or aspects are set forth in the following numbered clauses:

Clause 1. A computer-implemented method comprising: generating, with an electronic wallet transaction processing system, an electronic wallet key pair including an electronic wallet public key and a corresponding electronic wallet secret key, the electronic wallet key pair associated with the electronic wallet transaction processing system; receiving, with the electronic wallet transaction processing system, a payment gateway public key corresponding to a payment gateway secret key, the payment gateway public key and the payment gateway secret key associated with a payment gateway system; generating, with the electronic wallet transaction processing system, a public re-encryption key based on the payment gateway public key; communicating, from the electronic wallet transaction processing system to the payment gateway system, the public re-encryption key; receiving or determining, with the electronic wallet transaction processing system, encrypted transaction data associated with a transaction, the encrypted transaction data including an account identifier encrypted with the electronic wallet public key; re-encrypting, with the electronic wallet transaction processing system, the encrypted transaction data with the public re-encryption key; and communicating, from the electronic wallet transaction processing system to the payment gateway system, the re-encrypted transaction data.

Clause 2. The computer-implemented method of clause 1, further comprising: receiving, with the electronic wallet transaction processing system, user credentials associated with a user for the transaction; and authenticating, with the electronic wallet transaction processing system, the user for the transaction based on the user credentials, wherein authenticating the user for the transaction includes re-encrypting the encrypted transaction data with the public re-encryption key and communicating the re-encrypted transaction data to the payment gateway system.

Clause 3. The computer-implemented method of any of clauses 1 and 2, wherein the electronic wallet transaction processing system authenticates the user for the transaction based on the user credentials without decrypting the encrypted transaction data including the account identifier encrypted with the electronic wallet public key.

Clause 4. The computer-implemented method of any of clauses 1-3, further comprising: storing, with the electronic wallet transaction processing system in an in-memory database, the account identifier encrypted with the electronic wallet public key in association with the user credentials.

Clause 5. The computer-implemented method of any of clauses 1-4, wherein the electronic wallet transaction processing system communicates the re-encrypted transaction data to the payment gateway system via a merchant system.

Clause 6. The computer-implemented method of any of clauses 1-5, wherein the electronic wallet transaction processing system receives the user credentials associated with the user for the transaction from the merchant system.

Clause 7. The computer-implemented method of any of clauses 1-7, further comprising: receiving, with the payment gateway system, the re-encrypted transaction data; decrypting, with the payment gateway system, the re-encrypted transaction data based at least partially on the payment gateway secret key; and identifying, with the payment gateway, the account identifier.

Clause 8. A system comprising: an electronic wallet transaction processing system including one or more processors programmed and/or configured to: generate an electronic wallet key pair including an electronic wallet public key and a corresponding electronic wallet secret key, the electronic wallet key pair associated with the electronic wallet transaction processing system; receive a payment gateway public key corresponding to a payment gateway secret key, the payment gateway public key and the payment gateway secret key associated with a payment gateway system; generate a public re-encryption key based on the payment gateway public key; communicate, to the payment gateway system, the public re-encryption key; receive or determine encrypted transaction data associated with a transaction, the encrypted transaction data including an account identifier encrypted with the electronic wallet public key; re-encrypt the encrypted transaction data with the public re-encryption key; and communicate, to the payment gateway system, the re-encrypted transaction data.

Clause 9. The system of clause 8, wherein the electronic wallet transaction processing system including the one or more processors is further programmed and/or configured to: receive user credentials associated with a user for the transaction; and authenticate the user for the transaction based on the user credentials, wherein authenticating the user for the transaction includes re-encrypting the encrypted transaction data with the public re-encryption key and communicating the re-encrypted transaction data to the payment gateway system.

Clause 10. The system of any of clauses 8 and 9, wherein the electronic wallet transaction processing system including the one or more processors authenticates the user for the transaction based on the user credentials without decrypting the encrypted transaction data including the account identifier encrypted with the electronic wallet public key.

Clause 11. The system of any of clauses 8-10, wherein the electronic wallet transaction processing system including the one or more processors is further programmed and/or configured to: store, in an in-memory database, the account identifier encrypted with the electronic wallet public key in association with the user credentials.

Clause 12. The system of any of clauses 8-11, wherein the electronic wallet transaction processing system including the one or more processors communicates the re-encrypted transaction data to the payment gateway system via a merchant system.

Clause 13. The system of any of clauses 8-12, wherein the electronic wallet transaction processing system including the one or more processors receives the user credentials associated with the user for the transaction from the merchant system.

Clause 14. The system of any of clauses 8-13, further comprising: the payment gateway system including one or more processors programmed and/or configured to: receive the re-encrypted transaction data; decrypt the re-encrypted transaction data based at least partially on the payment gateway secret key; and identify the account identifier.

Clause 15. A computer program product comprising at least one non-transitory computer-readable medium including program instructions that, when executed by at least one processor, cause the at least one processor to: generate an electronic wallet key pair including an electronic wallet public key and a corresponding electronic wallet secret key, the electronic wallet key pair associated with the electronic wallet transaction processing system; receive a payment gateway public key corresponding to a payment gateway secret key, the payment gateway public key and the payment gateway secret key associated with a payment gateway system; generate a public re-encryption key based on the payment gateway public key; communicate, to the payment gateway system, the public re-encryption key; receive or determine encrypted transaction data associated with a transaction, the encrypted transaction data including an account identifier encrypted with the electronic wallet public key; re-encrypt the encrypted transaction data with the public re-encryption key; and communicate, to the payment gateway system, the re-encrypted transaction data.

Clause 16. The computer program product of clause 15, wherein the instructions further cause the at least one processor to: receive user credentials associated with a user for the transaction; and authenticate the user for the transaction based on the user credentials, wherein authenticating the user for the transaction includes re-encrypting the encrypted transaction data with the public re-encryption key and communicating the re-encrypted transaction data to the payment gateway system.

Clause 17. The computer program product of any of clauses 15 and 16, wherein the instructions cause the at least one processor to authenticate the user for the transaction based on the user credentials without decrypting the encrypted transaction data including the account identifier encrypted with the electronic wallet public key.

Clause 18. The computer program product of any of clauses 15-17, wherein the instructions further cause the at least one processor to: store, in an in-memory database, the account identifier encrypted with the electronic wallet public key in association with the user credentials.

Clause 19. The computer program product of any of clauses 15-18, wherein the instructions cause the at least one processor to: communicate the re-encrypted transaction data to the payment gateway system via a merchant system; and receive the user credentials associated with the user for the transaction from the merchant system.

Clause 20. The computer program product of any of clauses 15-19, wherein the instructions further cause the at least one processor to: receive the re-encrypted transaction data; decrypt the re-encrypted transaction data based at least partially on the payment gateway secret key; and identify the account identifier.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of limits. As used in the specification and the claims, the singular form of "a," "an," and "the" include plural referents unless the context clearly dictates otherwise.

BRIEF DESCRIPTION OF THE DRAWINGS

Additional advantages and details are explained in greater detail below with reference to the exemplary embodiments or aspects that are illustrated in the accompanying schematic figures, in which.

DESCRIPTION

Figure 1:
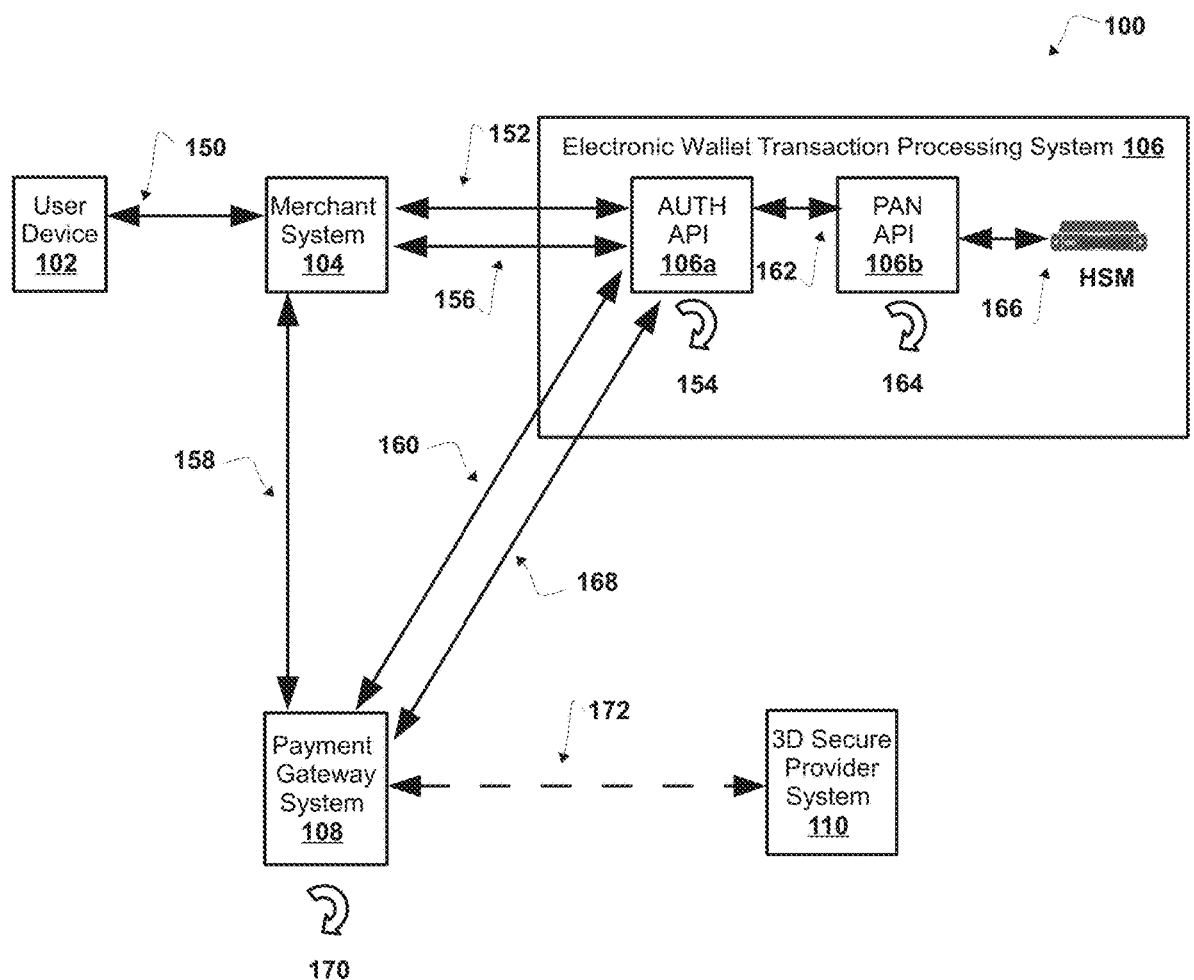
FIG. 1 is a signal flow diagram of an existing implementation of a process for authenticating a user for a transaction.

It is to be understood that the present disclosure may assume various alternative variations and step sequences, except where expressly specified to the contrary. It is also to be understood that the specific devices and processes illustrated in the attached drawings, and described in the following specification, are simply exemplary and non-limiting embodiments or aspects. Hence, specific dimensions and other physical characteristics related to the embodiments or aspects disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items, and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the terms "communication" and "communicate" refer to the receipt or transfer of one or more signals, messages, commands, or other type of data. For one unit (e.g., any device, system, or component thereof) to be in communication with another unit means that the one unit is able to directly or indirectly receive data from and/or transmit data to the other unit. This may refer to a direct or indirect connection that is wired and/or wireless in nature. Additionally, two units may be in communication with each other even though the data transmitted may be modified, processed, relayed, and/or routed between the first and second unit. For example, a first unit may be in communication with a second unit even though the first unit passively receives data and does not actively transmit data to the second unit. As another example, a first unit may be in communication with a second unit if an intermediary unit processes data from one unit and transmits processed data to the second unit. It will be appreciated that numerous other arrangements are possible.

It will be apparent that systems and/or methods, described herein, can be implemented in different forms of hardware, software, or a combination of hardware and software. The actual specialized control hardware or software code used to implement these systems and/or methods is not limiting of the implementations. Thus, the operation and behavior of the systems and/or methods are described herein without reference to specific software code, it being understood that software and hardware can be designed to implement the systems and/or methods based on the description herein.

Some non-limiting embodiments or aspects are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

As used herein, the term "transaction service provider" may refer to an entity that receives transaction authorization requests from merchants or other entities and provides guarantees of payment, in some cases through an agreement between the transaction service provider and an issuer institution. The terms "transaction service provider" and "transaction service provider system" may also refer to one or more computer systems operated by or on behalf of a transaction service provider, such as a transaction processing system executing one or more software applications. A transaction processing system may include one or more server computers with one or more processors and, in some non-limiting embodiments or aspects, may be operated by or on behalf of a transaction service provider.

As used herein, the term "account identifier" may include one or more Primary Account Numbers (PAN), tokens, or other identifiers (e.g., a globally unique identifier (GUID), a universally unique identifier (UUID), etc.) associated with a customer account of a user (e.g., a customer, a consumer, and/or the like). The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifier in one or more databases such that they can be used to conduct a transaction without directly using the original account identifier. In some examples, an original account identifier, such as a PAN, may be associated with a plurality of tokens for different individuals or purposes.

As used herein, the terms "issuer institution," "portable financial device issuer," "issuer," or "issuer bank" may refer to one or more entities that provide one or more accounts to a user (e.g., a customer, a consumer, an entity, an organization, and/or the like) for conducting transactions (e.g., payment transactions), such as initiating credit card payment transactions and/or debit card payment transactions. For example, an issuer institution may provide an account identifier, such as a personal account number (PAN), to a user that uniquely identifies one or more accounts associated with that user. The account identifier may be embodied on a portable financial device, such as a physical financial instrument (e.g., a payment card), and/or may be electronic and used for electronic payments. In some non-limiting embodiments or aspects, an issuer institution may be associated with a bank identification number (BIN) that uniquely identifies the issuer institution. As used herein "issuer institution system" may refer to one or more computer systems operated by or on behalf of an issuer institution, such as a server computer executing one or more software applications. For example, an issuer institution system may include one or more authorization servers for authorizing a payment transaction.

As used herein, the term "merchant" may refer to an individual or entity that provides products and/or services, or access to products and/or services, to customers based on a transaction, such as a payment transaction. The term "merchant" or "merchant system" may also refer to one or more computer systems operated by or on behalf of a merchant, such as a server computer executing one or more software applications. A "point-of-sale (POS) system," as used herein, may refer to one or more computers and/or peripheral devices used by a merchant to engage in payment transactions with customers, including one or more card readers, near-field communication (NFC) receivers, RFID receivers, and/or other contactless transceivers or receivers, contact-based receivers, payment terminals, computers, servers, input devices, and/or other like devices that can be used to initiate a payment transaction.

As used herein, the term "mobile device" may refer to one or more portable electronic devices configured to communicate with one or more networks. As an example, a mobile device may include a cellular phone (e.g., a smartphone or standard cellular phone), a portable computer (e.g., a tablet computer, a laptop computer, etc.), a wearable device (e.g., a watch, pair of glasses, lens, clothing, and/or the like), a personal digital assistant (PDA), and/or other like devices. The terms "client device" and "user device," as used herein, refer to any electronic device that is configured to communicate with one or more servers or remote devices and/or systems. A client device or user device may include a mobile device, a network-enabled appliance (e.g., a network-enabled television, refrigerator, thermostat, and/or the like), a computer, a POS system, and/or any other device or system capable of communicating with a network.

As used herein, the term "computing device" or "computer device" may refer to one or more electronic devices that are configured to directly or indirectly communicate with or over one or more networks. The computing device may be a mobile device, a desktop computer, or the like. Furthermore, the term "computer" may refer to any computing device that includes the necessary components to receive, process, and output data, and normally includes a display, a processor, a memory, an input device, and a network interface. An "application" or "application program interface" (API) refers to computer code or other data sorted on a computer-readable medium that may be executed by a processor to facilitate the interaction between software components, such as a client-side front-end and/or server-side back-end for receiving data from the client. An "interface" refers to a generated display, such as one or more graphical user interfaces (GUIs) with which a user may interact, either directly or indirectly (e.g., through a keyboard, mouse, touchscreen, etc.).

As used herein, the terms "electronic wallet" and "electronic wallet application" refer to one or more electronic devices and/or software applications configured to initiate and/or conduct payment transactions. For example, an electronic wallet may include a mobile device executing an electronic wallet application, and may further include server-side software and/or databases for maintaining and providing transaction data to the mobile device. An "electronic wallet provider" may include an entity that provides and/or maintains an electronic wallet for a customer, such as Google Wallet™, Android Pay®, Apple Pay®, Samsung Pay®, and/or other like electronic payment systems. In some non-limiting examples, an issuer bank may be an electronic wallet provider.

As used herein, the term "electronic wallet transaction processing system" may refer to one or more electronic devices and/or software applications configured to process and/or a request to authenticate a user for a transaction initiated and/or conducted by an electronic wallet application. For example, an electronic wallet transaction processing system may include server-side software and/or databases for maintaining and providing transaction data and/or account data to a merchant system and/or a payment gateway system for processing and/or authenticating a user for an electronic wallet transaction. An "electronic wallet transaction processing system provider" may include an entity that provides and/or maintains an electronic wallet transaction processing system, such as Visa Checkout, Mastercard MasterPass™, PayPal Checkout, and/or other like electronic wallet transaction processing system providers. In some non-limiting examples, a transaction service provider system may be an electronic wallet transaction processing system.

The term "account data," as used herein, refers to any data concerning one or more accounts for one or more users. Account data may include, for example, one or more account identifiers, user identifiers, transaction histories, balances, credit limits, issuer institution identifiers, and/or the like.

As used herein, the term "portable financial device" or "payment device" may refer to a payment card (e.g., a credit or debit card), a gift card, a smartcard, smart media, a payroll card, a healthcare card, a wrist band, a machine-readable medium containing account information, a keychain device or fob, an RFID transponder, a retailer discount or loyalty card, a mobile device executing an electronic wallet application, a personal digital assistant (PDA), a security card, an access card, a wireless terminal, and/or a transponder, as examples. The portable financial device may include a volatile or a non-volatile memory to store information, such as an account identifier and/or a name of the account holder.

As used herein, the term "server" may refer to or include one or more processors or computers, storage devices, or similar computer arrangements that are operated by or facilitate communication and processing for multiple parties in a network environment, such as the Internet, although it will be appreciated that communication may be facilitated over one or more public or private network environments and that various other arrangements are possible. Further, multiple computers, e.g., servers, or other computerized devices, such as POS devices, directly or indirectly communicating in the network environment may constitute a "system," such as a merchant's POS system.

As used herein, the term "acquirer" may refer to an entity licensed by the transaction service provider and/or approved by the transaction service provider to originate transactions using a portable financial device of the transaction service provider. Acquirer may also refer to one or more computer systems operated by or on behalf of an acquirer, such as a server computer executing one or more software applications (e.g., "acquirer server"). An "acquirer" may be a merchant bank, or in some cases, the merchant system may be the acquirer. The transactions may include original credit transactions (OCTs) and account funding transactions (AFTs). The acquirer may be authorized by the transaction service provider to sign merchants of service providers to originate transactions using a portable financial device of the transaction service provider. The acquirer may contract with payment facilitators to enable the facilitators to sponsor merchants. The acquirer may monitor compliance of the payment facilitators in accordance with regulations of the transaction service provider. The acquirer may conduct due diligence of payment facilitators and ensure that proper due diligence occurs before signing a sponsored merchant. Acquirers may be liable for all transaction service provider programs that they operate or sponsor. Acquirers may be responsible for the acts of its payment facilitators and the merchants it or its payment facilitators sponsor.

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like, operated by or on behalf of a payment gateway.

As used herein, the term "3D secure provider" may refer to an entity that receives transaction data and/or account data, such as an account identifier, and/or the like, from a payment gateway or other entities and provides an additional security layer for electronic transactions. For example, a 3D secure provider may enable consumers to authenticate themselves with their card issuer when making card-not-present (CNP) e-commerce purchases with an additional security layer that helps inhibit or prevent unauthorized CNP (Card not present transaction) transactions and protects the merchant from CNP exposure to fraud. The term "3D secure provider system" may refer to one or more computer systems operated by or on behalf of a 3D secure provider, such as a 3D secure server executing one or more software applications. A 3D secure server may include one or more processors and, in some non-limiting embodiments or aspects, may be operated by or on behalf of a 3D secure provider. A 3D secure provider may include Verified by Visa/Visa Secure, MasterCard SecureCode, JCB International J/Secure, American Express SafeKey, or any other entity that provides an additional security layer for electronic transactions.

Provided are improved systems, devices, products, apparatus, and/or methods for authenticating a user for a transaction.

As previously discussed, a data flow loop problem may occur when two parties share data via an untrusted intermediary. For example, for authenticating a user or payer for an electronic wallet transaction, an electronic wallet transaction processing system may send a PAN associated with the user to a payment gateway via a merchant system with which the user initiated or is conducting the electronic wallet transaction. Referring now to FIG. 1, FIG. 1 is a signal flow diagram of an existing implementation 100 of a process for authenticating a user for a transaction. As shown in FIG. 1, at reference number 150, merchant system 104 may receive user credentials (e.g., a username, a password, etc.) from a user device 102 for initiating or conducting an electronic wallet transaction (e.g., for a consumer checking out using electronic wallet credentials at a merchant website, etc.). At reference number 152, merchant system 104 may securely communicate the user credentials (e.g., by encrypting the user credentials with a public key, etc.) to electronic wallet transaction processing system 106 (e.g., for requesting authentication of a user for the transaction, etc.). At reference number 154, electronic wallet transaction processing system 106 may authenticate the user for the transaction by checking or matching the user credentials against a database of user credentials (e.g., using authentication API 106a, etc.). At reference number 156, after a successful authentication of the user for the transaction, electronic wallet transaction processing system 106 may communicate a unique random ID associated with the transaction to payment gateway 108 via merchant system 104. For example, merchant system 104 may receive the unique random ID and, at reference number 158, forward the unique random ID to payment gateway system 108. At reference number 160, payment gateway 108 communicates a request for the PAN associated with the user for the transaction. Electronic wallet transaction processing system 106 and payment gateway 108 may exchange and/or store, before processing of the transaction, an auth API secret and/or digital signature associated with the payment gateway as credentials for authenticating payment gateway 108 for requesting the PAN associated with the user for the transaction. At reference number 162, electronic wallet transaction processing system 106 authenticates payment gateway 108 for the request for the PAN associated with the electronic wallet of the user (e.g., at authentication API 106a, etc.) and forwards the request to PAN data API 106b for retrieval of the PAN. At reference number 164, electronic wallet transaction processing system 106 (e.g., PAN data API 106b, etc.) retrieves encrypted PAN data associated with the electronic wallet of the user. At reference number 166, electronic wallet transaction processing system 106 (e.g., PAN data API 106b, etc.) decrypts the encrypted PAN data to retrieve the PAN associated with the electronic wallet of the user using a hardware security module (HSM). At reference number 168, electronic wallet transaction processing system 106 encrypts the PAN associated with the electronic wallet of the user with a payment gateway public key and communicates the encrypted PAN to payment gateway 108. At reference number 170, payment gateway 108 decrypts the encrypted PAN using a payment gateway secret key corresponding to the payment gateway public key. At reference number 172, payment gateway 108 communicates data associated with the PAN (e.g., the PAN, a BIN of the PAN, etc.) to 3D secure provider system 110 for further authentication of the user and authorization of the transaction.

In this way, an existing process for authenticating a user for a transaction may (i) rely on HSM processing during processing of a transaction, which results in longer transaction processing times (e.g., slower electronic wallet checkout, etc.) and increased operational overhead, and (ii) use multiple communications between electronic wallet transaction processing system 106 and payment gateway 108 (e.g., extraneous wallet integrations, additional network input/output, etc.), which may also result in longer transaction processing times or slower electronic wallet checkout. Accordingly, an existing process for authenticating a user for a transaction may be inefficient and time-consuming, thereby resulting in increased checkout processing times.

Non-limiting embodiments or aspects of the present disclosure are directed to systems, methods, and computer program products for authenticating a user for a transaction that generate an electronic wallet key pair including an electronic wallet public key and a corresponding electronic wallet secret key, the electronic wallet key pair associated with the electronic wallet transaction processing system; receive a payment gateway public key corresponding to a payment gateway secret key, the payment gateway public key and the payment gateway secret key associated with a payment gateway system; generate a public re-encryption key based on the payment gateway public key; communicate, to the payment gateway system, the public re-encryption key; receive or determine encrypted transaction data associated with a transaction, the encrypted transaction data including an account identifier encrypted with the electronic wallet public key; re-encrypt the encrypted transaction data with the public re-encryption key; and communicate, to the payment gateway system, the re-encrypted transaction data. In this way, non-limiting embodiments or aspects of the present disclosure may i) avoid reliance on HSM processing during processing of a transaction for decrypting a PAN at an electronic payment transaction processing system and/or use in-memory processing for authenticating a user with the electronic payment transaction processing system, which results in faster transaction processing times (e.g., faster electronic wallet checkout, etc.) and decreased operational overhead, and (ii) reduce communications between the electronic wallet transaction processing system and a payment gateway (e.g., avoid wallet integrations, avoid additional network input/output, etc.), which may also result in faster transaction processing times and/or faster electronic wallet checkout. Accordingly, non-limiting embodiments or aspects of the present disclosure may provide a process for authenticating a user for a transaction that is more efficient and less time-consuming, thereby resulting in reduced checkout processing times.

Figure 2:
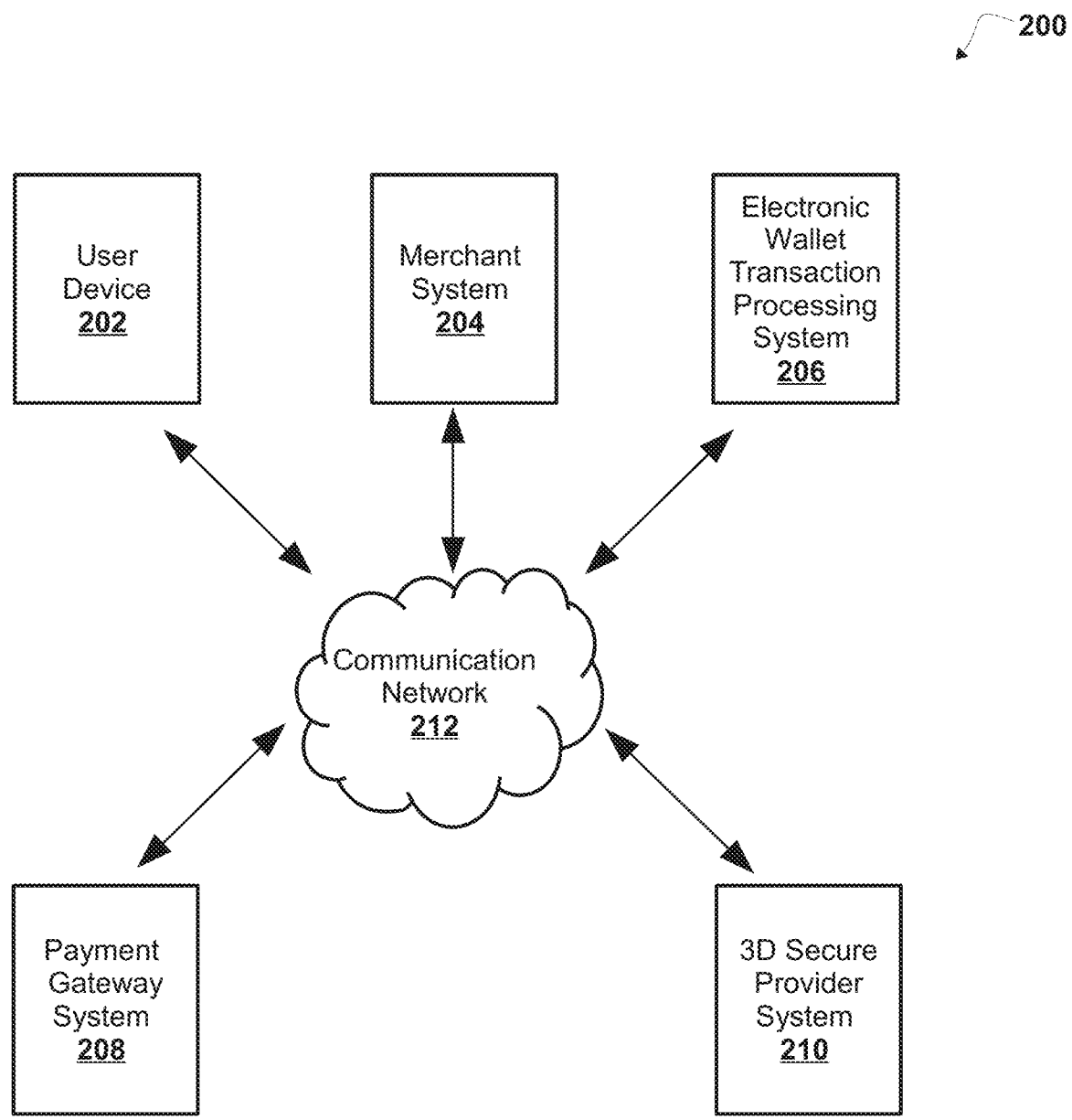
FIG. 2 is a diagram of non-limiting embodiments or aspects of an environment in which systems, devices, products, apparatus, and/or methods, described herein, may be implemented.

Referring now to FIG. 2, FIG. 2 is a diagram of an example environment 200 in which devices, systems, methods, and/or products described herein, may be implemented. As shown in FIG. 2, environment 200 may include user device 202, merchant system 204, electronic wallet transaction processing system 206, payment gateway system 208, and/or 3D secure provider system 210. User device 202, merchant system 204, electronic wallet transaction processing system 206, payment gateway system 208, and/or 3D secure provider system 210 may interconnect (e.g., establish a connection to communicate, etc.) via wired connections, wireless connections, or a combination of wired and wireless connections.

User device 202 may include one or more devices capable of receiving information and/or data from merchant system 204, electronic wallet transaction processing system 206, payment gateway system 208, and/or 3D secure provider system 210 (e.g., via communication network 212, etc.) and/or communicating information and/or data to merchant system 204, electronic wallet transaction processing system 206, payment gateway system 208, and/or 3D secure provider system 210 (e.g., via communication network 212, etc.). For example, user device 202 may include a client device and/or the like. In some non-limiting embodiments or aspects, user device 202 may be capable of receiving information (e.g., from merchant system 204, etc.) via a short range wireless communication connection (e.g., an NFC communication connection, an RFID communication connection, a Bluetooth® communication connection, and/or the like), and/or communicating information (e.g., to merchant system 204, etc.) via a short range wireless communication connection. In some non-limiting embodiments or aspects, user device 202 may include an application associated with user device 202, such as an application stored on user device 202, a mobile application (e.g., a mobile device application, a native application for a mobile device, a mobile cloud application for a mobile device, an electronic wallet application, and/or the like) stored and/or executed on user device 202.

Merchant system 204 may include one or more devices capable of receiving information and/or data from user device 202, electronic wallet transaction processing system 206, payment gateway system 208, and/or 3D secure provider system 210 (e.g., via communication network 212, etc.) and/or communicating information and/or data to user device 202, electronic wallet transaction processing system 206, payment gateway system 208, and/or 3D secure provider system 210 (e.g., via communication network 212, etc.). Merchant system 204 may include a device capable of receiving information and/or data from user device 202 via a communication connection (e.g., an NFC communication connection, an RFID communication connection, a Bluetooth® communication connection, etc.) with user device 202, and/or communicating information and/or data to user device 202 via the communication connection. For example, merchant system 204 may include a computing device, such as a server, a group of servers, a client device, a group of client devices, and/or other like devices. In some non-limiting embodiments or aspects, merchant system 204 may be associated with a merchant as described herein. In some non-limiting embodiments or aspects, merchant system 204 may include one or more devices, such as computers, computer systems, and/or peripheral devices capable of being used by a merchant to conduct a payment transaction with a user. For example, merchant system 204 may include a POS device and/or a POS system. In some non-limiting embodiments or aspects, merchant system 204 may provide a merchant website via which a user can initiate and/or conduct a transaction with an electronic wallet application stored and/or executed on user device 202.

Electronic wallet transaction processing system 206 may include one or more devices capable of receiving information and/or data from user device 202, merchant system 204, payment gateway system 208, and/or 3D secure provider system 210 (e.g., via communication network 212, etc.) and/or communicating information and/or data to user device 202, merchant system 204, payment gateway system 208, and/or 3D secure provider system 210 (e.g., via communication network 212, etc.). For example, electronic wallet transaction processing system 206 may include a computing device, such as a server (e.g., a transaction processing server, etc.), a group of servers, and/or other like devices. In some non-limiting embodiments or aspects, electronic wallet transaction processing system 206 may be associated with a transaction service provider and/or an electronic wallet system provider as described herein. In some non-limiting embodiments or aspects, electronic wallet transaction processing system 206 may include and/or access one or more one or more internal and/or external databases including account data, PAN data, transaction data, merchant data, and/or the like.

Payment gateway system 208 may include one or more devices capable of receiving information and/or data from user device 202, merchant system 204, electronic wallet transaction processing system 206, and/or 3D secure provider system 210 (e.g., via communication network 212, etc.) and/or communicating information and/or data to user device 202, merchant system 204, electronic wallet transaction processing system 206, and/or 3D secure provider system 210 (e.g., via communication network 212, etc.). For example, payment gateway system 208 may include a computing device, such as a server, a group of servers, and/or other like devices. In some non-limiting embodiments or aspects, payment gateway system 208 is associated with a payment gateway as described herein.

3D secure provider system 210 may include one or more devices capable of receiving information and/or data from user device 202, merchant system 204, electronic wallet transaction processing system 206, and/or payment gateway system 208 (e.g., via communication network 212, etc.) and/or communicating information and/or data to user device 202, merchant system 204, electronic wallet transaction processing system 206, and/or payment gateway system 208 (e.g., via communication network 212, etc.). For example, 3D secure provider system 210 may include a computing device, such as a server, a group of servers, and/or other like devices. In some non-limiting embodiments or aspects, 3D secure provider system 210 may be associated with an issuer institution and/or a transaction service provider as described herein.

Communication network 212 may include one or more wired and/or wireless networks. For example, communication network 212 may include a cellular network (e.g., a long-term evolution (LTE) network, a third generation (3G) network, a fourth generation (4G) network, a fifth generation network (5G), a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of these or other types of networks.

The number and arrangement of devices and systems shown in FIG. 2 is provided as an example. There may be additional devices and/or systems, fewer devices and/or systems, different devices and/or systems, or differently arranged devices and/or systems than those shown in FIG. 2. Furthermore, two or more devices and/or systems shown in FIG. 2 may be implemented within a single device and/or system, or a single device and/or system shown in FIG. 2 may be implemented as multiple, distributed devices and/or systems. Additionally, or alternatively, a set of devices and/or systems (e.g., one or more devices or systems) of environment 200 may perform one or more functions described as being performed by another set of devices or systems of environment 200.

Figure 3:
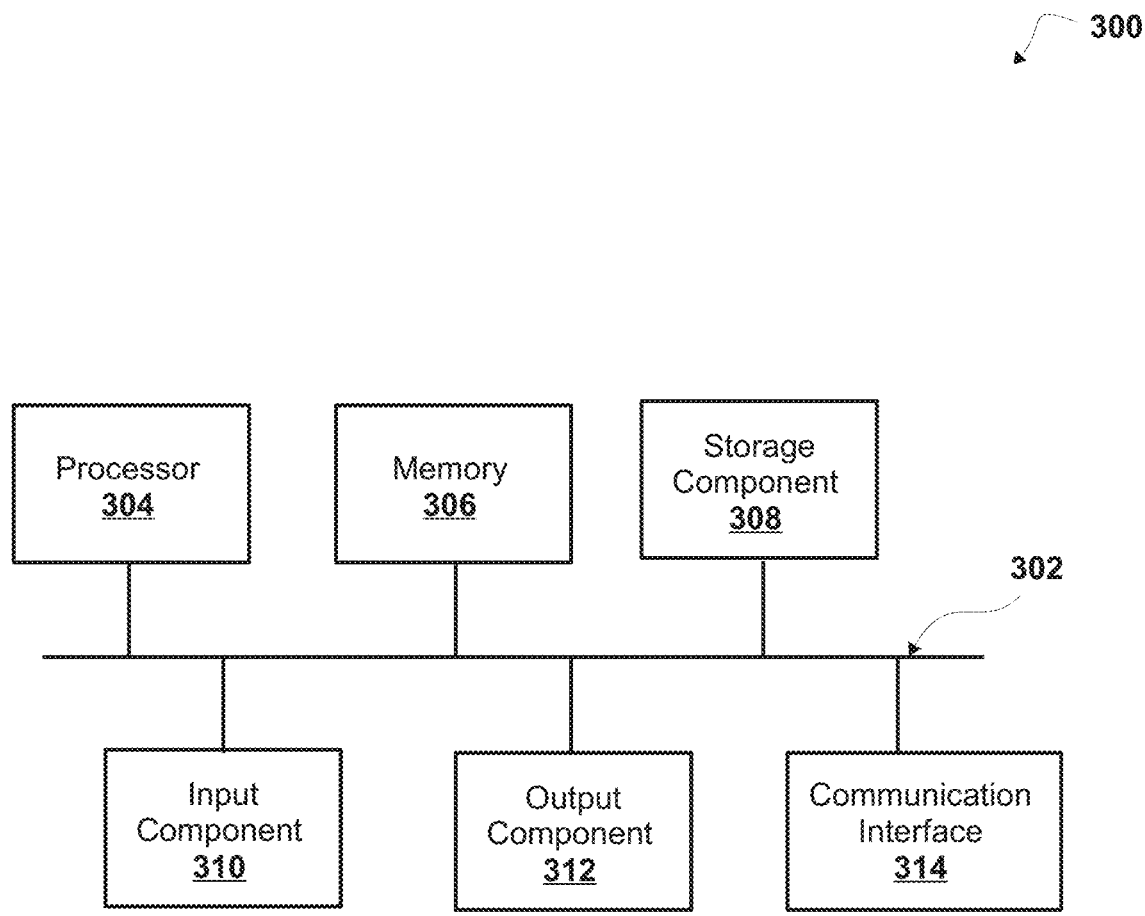
FIG. 3 is a diagram of non-limiting embodiments or aspects of components of one or more devices and/or one or more systems of FIG. 2.

Referring now to FIG. 3, FIG. 3 is a diagram of example components of a device 300. Device 300 may correspond to user device 202 (e.g., one or more devices of a system of user device 202, etc.), one or more devices of merchant system 204, one or more devices of electronic wallet transaction processing system 206, one or more devices of payment gateway system 208, and/or 3D one or more devices of secure provider system 210. In some non-limiting embodiments or aspects, user device 202 (e.g., one or more devices of a system of user device 202, etc.), one or more devices of merchant system 204, one or more devices of electronic wallet transaction processing system 206, one or more devices of payment gateway system 208, and/or 3D one or more devices of secure provider system 210 may include at least one device 300 and/or at least one component of device 300. As shown in FIG. 3, device 300 may include a bus 302, a processor 304, memory 306, a storage component 308, an input component 310, an output component 312, and a communication interface 314.

Bus 302 may include a component that permits communication among the components of device 300. In some non-limiting embodiments or aspects, processor 304 may be implemented in hardware, firmware, or a combination of hardware and software. For example, processor 304 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 306 may include random access memory (RAM), read only memory (ROM), and/or another type of dynamic or static storage device (e.g., flash memory, magnetic memory, optical memory, etc.) that stores information and/or instructions for use by processor 304.

Storage component 308 may store information and/or software related to the operation and use of device 300. For example, storage component 308 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 310 may include a component that permits device 300 to receive information, such as via user input (e.g., a touch screen display, a keyboard, a keypad, a mouse, a button, a switch, a microphone, etc.). Additionally, or alternatively, input component 310 may include a sensor for sensing information (e.g., a global positioning system (GPS) component, an accelerometer, a gyroscope, an actuator, etc.). Output component 312 may include a component that provides output information from device 300 (e.g., a display, a speaker, one or more light-emitting diodes (LEDs), etc.).

Communication interface 314 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 314 may permit device 300 to receive information from another device and/or provide information to another device. For example, communication interface 314 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 300 may perform one or more processes described herein. Device 300 may perform these processes based on processor 304 executing software instructions stored by a computer-readable medium, such as memory 306 and/or storage component 308. A computer-readable medium (e.g., a non-transitory computer-readable medium) is defined herein as a non-transitory memory device. A memory device includes memory space located inside of a single physical storage device or memory space spread across multiple physical storage devices.

Software instructions may be read into memory 306 and/or storage component 308 from another computer-readable medium or from another device via communication interface 314. When executed, software instructions stored in memory 306 and/or storage component 308 may cause processor 304 to perform one or more processes described herein. Additionally, or alternatively, hardwired circuitry may be used in place of or in combination with software instructions to perform one or more processes described herein. Thus, embodiments or aspects described herein are not limited to any specific combination of hardware circuitry and software.

Memory 306 and/or storage component 308 may include data storage or one or more data structures (e.g., a database, etc.). Device 300 may be capable of receiving information from, storing information in, communicating information to, or searching information stored in the data storage or one or more data structures in memory 306 and/or storage component 308. For example, electronic wallet transaction processing system 206 may include and/or access one or more internal and/or external databases that store transaction data associated with transactions processed and/or being processed, account data, PAN data, transaction data, encrypted data, and/or the like.

The number and arrangement of components shown in FIG. 3 are provided as an example. In some non-limiting embodiments or aspects, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
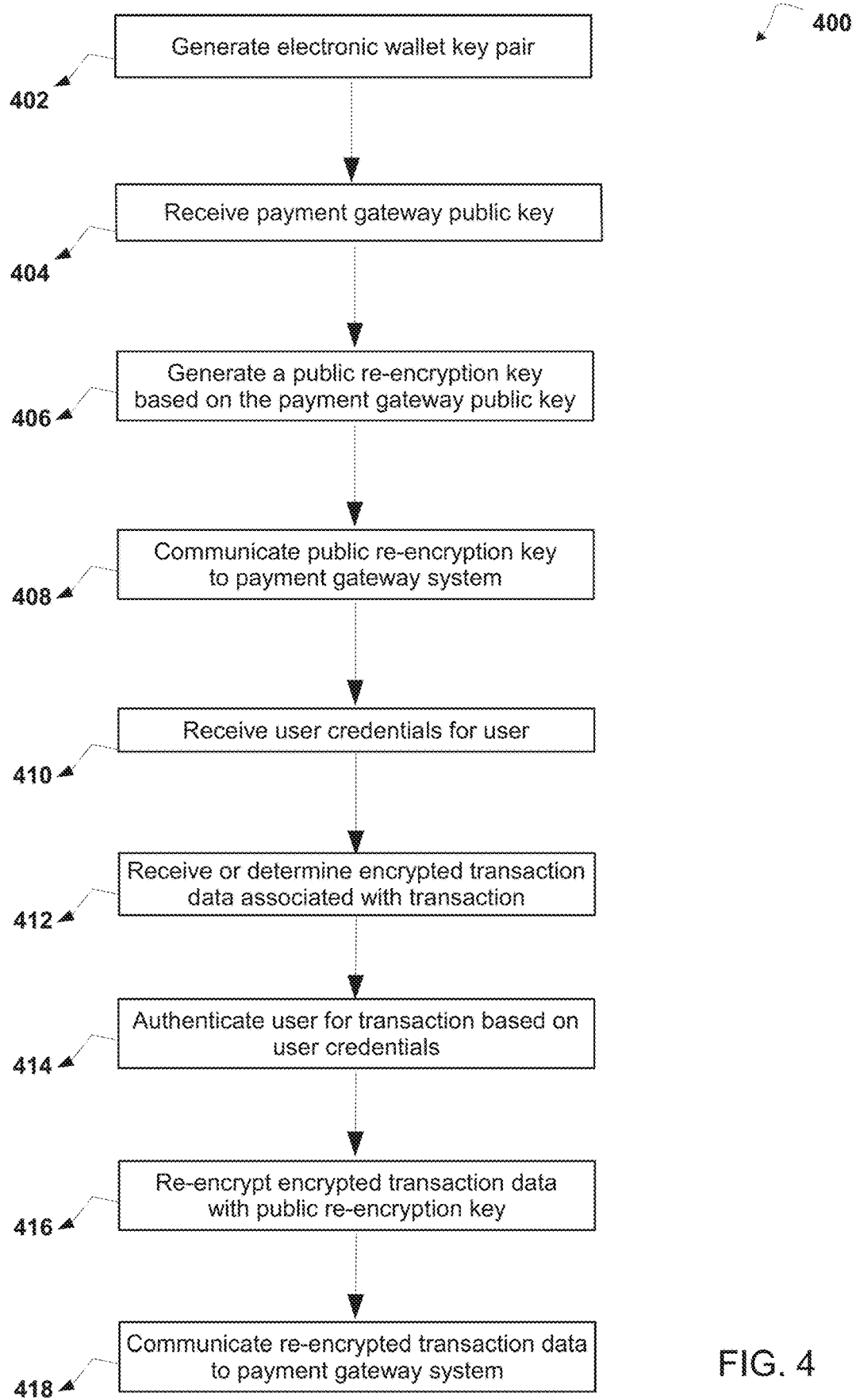
FIG. 4 is a flowchart of non-limiting embodiments or aspects of a process for authenticating a user for a transaction.

Referring now to FIG. 4, FIG. 4 is a diagram of non-limiting embodiments or aspects of a process 400 for authenticating a user for a transaction. In some non-limiting embodiments or aspects, one or more of the steps of process 400 may be performed (e.g., completely, partially, etc.) by electronic wallet transaction processing system 206 (e.g., one or more devices of electronic wallet transaction processing system 206). In some non-limiting embodiments or aspects, one or more of the steps of process 400 may be performed (e.g., completely, partially, etc.) by another device or a group of devices separate from or including electronic wallet transaction processing system 206, such as user device 202 (e.g., one or more devices of a system of user device 102), merchant system 204 (e.g., one or more devices of merchant system 204), payment gateway system 208 (e.g., one or more devices of payment gateway system 208), and/or 3D secure provider system 210 (e.g., one or more devices of 3D secure provider system 210).

As shown in FIG. 4, at step 402, process 400 includes generating an electronic wallet key pair. For example, electronic wallet transaction processing system 206 may generate an electronic wallet key pair. As an example, electronic wallet transaction processing system 206 may generate an electronic wallet key pair including an electronic wallet public key and a corresponding electronic wallet secret key. In such an example, the electronic wallet key pair may be associated with the electronic wallet transaction processing system 206.

Figure 5:
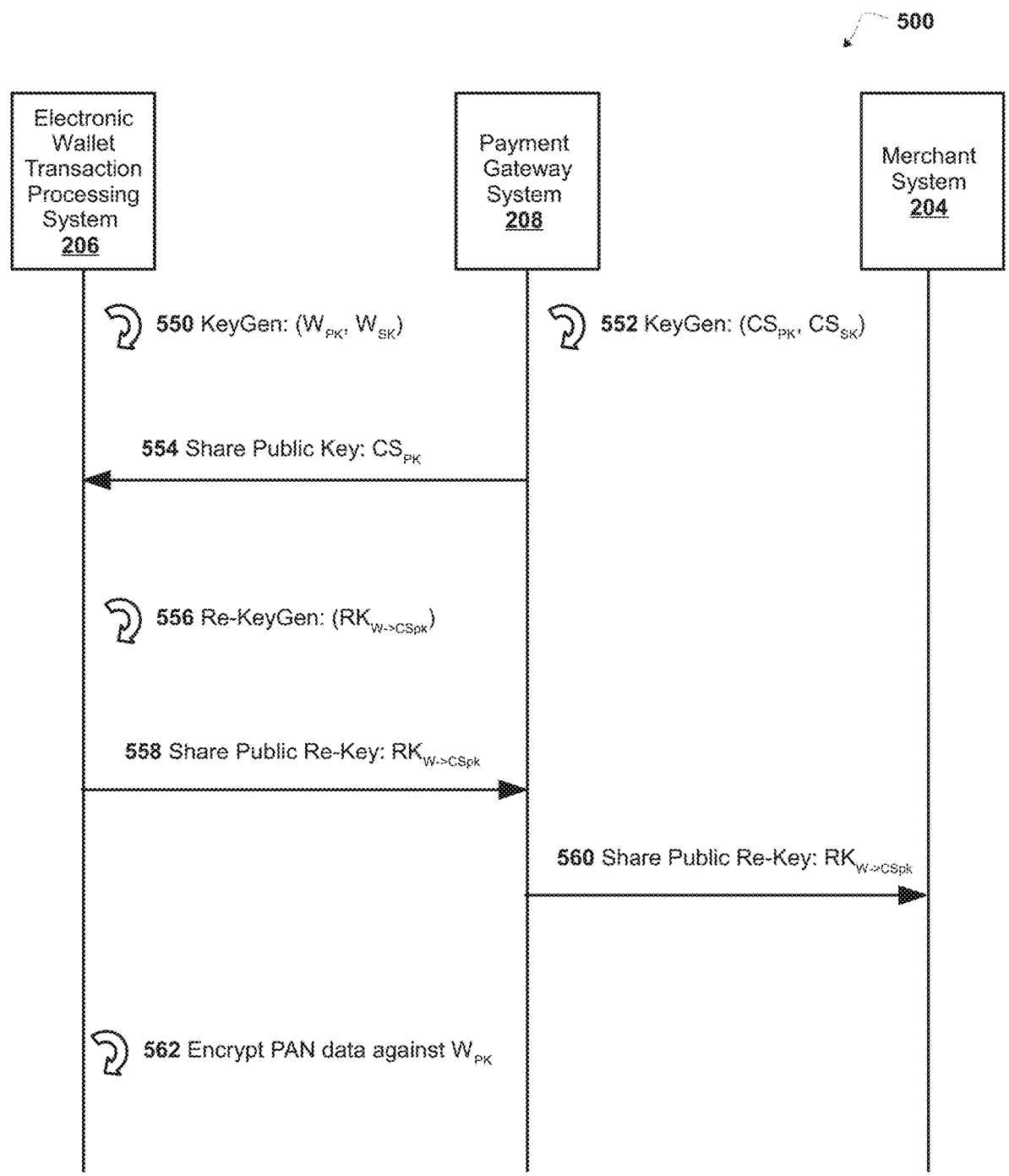
FIG. 5 is a signal flow diagram of an implementation of non-limiting embodiments or aspects of a process for authenticating a user for a transaction.

Referring also to FIG. 5, FIG. 5 is a signal flow diagram of an implementation 500 of non-limiting embodiments or aspects of a process for authenticating a user for a transaction. As shown in FIG. 5, at reference number 550, electronic wallet transaction processing system 206 may generate the electronic wallet key pair (e.g., $W_{PK}$, $W_{SK}$, etc.) during a key setup process, which may be an offline process and/or a process performed before receiving user credentials associated with an account identifier in response to a transaction being initiated and/or conducted for the user credentials.

As shown in FIG. 4, at step 404, process 400 includes receiving a payment gateway public key. For example, electronic wallet transaction processing system 206 may receive a payment gateway public key. As an example, electronic wallet transaction processing system 206 may receive a payment gateway public key corresponding to a payment gateway secret key. In such an example, the payment gateway public key and the payment gateway secret key may be associated with payment gateway system 208.

Referring again to FIG. 5, at reference number 552, payment gateway 208 may generate a payment gateway key pair (e.g., $PG_{PK}$, $PG_{SK}$, etc.) including the payment gateway public key (e.g., $PG_{PK}$, etc.) corresponding to the payment gateway secret key (e.g., $PG_{SK}$, etc.) during the key setup process. At reference number 554, payment gateway 208 may communicate the payment gateway public key to electronic wallet transaction processing system 206. For example, electronic wallet transaction processing system 206 may receive the payment gateway public key from payment gateway 208 during the key setup process.

As shown in FIG. 4, at step 406, process 400 includes generating a public re-encryption key based on a payment gateway public key. For example, electronic wallet transaction processing system 206 may generate a public re-encryption key based on a payment gateway public key. As an example, electronic wallet transaction processing system 206 may generate a public re-encryption key based on the payment gateway public key received from payment gateway system 208.

In some non-limiting embodiments or aspects, electronic wallet transaction processing system 206 may generate a public re-encryption key based on a public key as described by Ateniese, G., Fu, K., Green, M., Hohenberger, S. in the paper titled "Improved Proxy Re-encryption Schemes with Applications to Secure Distributed Storage" published in The 12th Annual Network and Distributed System Security Symposium, pp. 29-43 (2005), the entire contents of which is incorporated herein by reference. For example, and referring again to FIG. 5, at reference number 556, electronic wallet transaction processing system 206 may generate, during the key setup process, a public re-encryption key (e.g., $RK_{W \to PGpk}$, etc.) using the payment gateway public key (e.g., $PG_{PK}$, etc.) received from payment gateway 208.

As shown in FIG. 4, at step 408, process 400 includes communicating a public re-encryption key to a payment gateway system. For example, electronic wallet transaction processing system 206 may communicate a public re-encryption key to payment gateway system 208. As an example, electronic wallet transaction processing system 206 may communicate the public re-encryption key to payment gateway system 208. In such an example, and referring again to FIG. 5, at reference number 558, electronic wallet transaction processing system 206 may communicate the public re-encryption key (e.g., $RK_{W \to PGpk}$, etc.) to payment gateway system 208 during the key setup process. At reference number 560, payment gateway system 208 (and/or electronic wallet transaction processing system 206, etc.) may communicate the public re-encryption key (e.g., $RK_{W \to PGpk}$, etc.) to merchant system 204.

As shown in FIG. 4, at step 410, process 400 includes receiving user credentials for a user. For example, electronic wallet transaction processing system 206 may receive user credentials for a user. As an example, electronic wallet transaction processing system 206 may receive user credentials associated with a user for a transaction.

Figure 6:
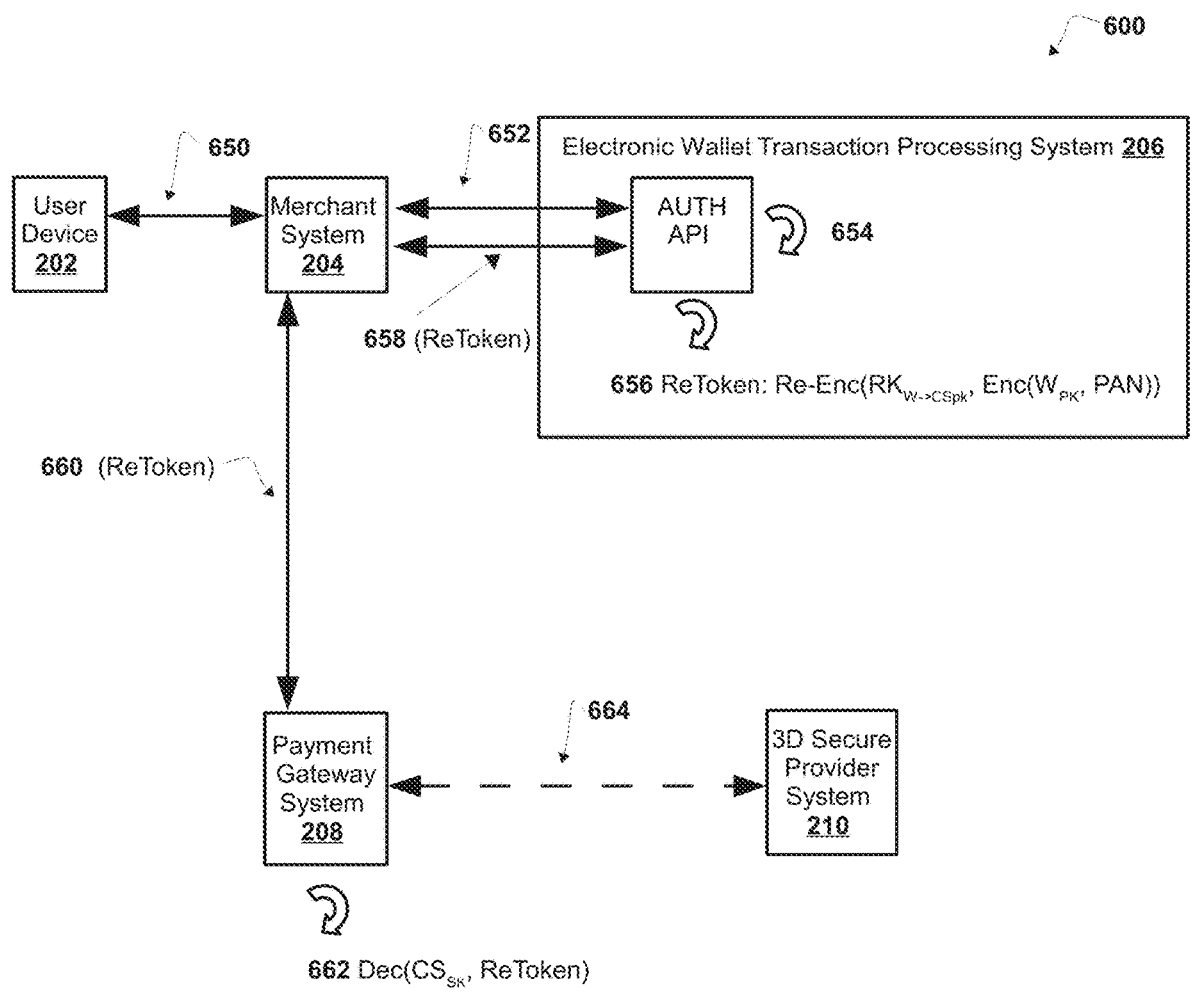
FIG. 6 is a signal flow diagram of an implementation of non-limiting embodiments or aspects of a process for authenticating a user for a transaction.

In some non-limiting embodiments or aspects, electronic wallet transaction processing system 206 receives the user credentials associated with the user for the transaction from merchant system 204. For example, and referring also to FIG. 6, FIG. 6 is a signal flow diagram of an implementation 600 of non-limiting embodiments or aspects of a process for authenticating a user for a transaction. As shown in FIG. 6, at reference number 650, merchant system 204 may receive user credentials, such as a user name and a password, and/or the like, from user device 202 for initiating or conducting a transaction at merchant system 204, and communicate the user credentials, which may be encrypted using the public re-encryption key (e.g., $RK_{W \to PGpk}$, etc.) to electronic wallet transaction processing system 206, at reference number 652.

As shown in FIG. 4, at step 412, process 400 includes receiving or determining encrypted transaction data associated with a transaction. For example, electronic wallet transaction processing system 206 may receive or determine encrypted transaction data associated with a transaction. As an example, electronic wallet transaction processing system 206 may receive or determine encrypted transaction data associated with the transaction. In such an example, the encrypted transaction data may include an account identifier (e.g., a PAN, etc.) encrypted with the electronic wallet public key.

In some non-limiting embodiments or aspects, transaction data includes transaction parameters associated with transactions, such as payment transactions initiated and/or conducted with an electronic wallet application, and/or the like. Non-limiting examples of transaction parameters include: electronic wallet card data, decision data, authorization data, account identifier (e.g., PAN, etc.), transaction amount, transaction date and time, conversion rate of currency, merchant type, acquiring institution country, PAN country, response code, merchant name/location, type of currency, and/or the like. Response code may refer to a successful approval/completion of a transaction, denial because card reported as lost or stolen, do not honor, partial approval, VIP approval (VIP program), amount exceeds maximum, insufficient funds, incorrect PIN, suspected fraud, activity amount exceeded, allowable number of PIN-entry tries exceeded, and/or the like. In some non-limiting embodiments or aspects, electronic wallet card data includes one or more of data associated with an identifier regarding a portable financial device to be provided to an electronic wallet application, data associated with an identifier of an issuer associated with the portable financial device to be provided to an electronic wallet application, data associated with an identifier of a transaction service provider associated with the portable financial device to be provided to an electronic wallet application, data associated with a name of a user associated with the portable financial device to be provided to an electronic wallet application, data associated with an account identifier of an account associated with the portable financial device to be provided to an electronic wallet application, and/or the like.

In some non-limiting embodiments or aspects, electronic wallet transaction processing system 206 may store, in an in-memory database, the account identifier encrypted with the electronic wallet public key in association with the user credentials. For example, electronic wallet transaction processing system 206 may encrypt and store the account identifiers (e.g., PANs, etc.) associated with registered users or accounts having user credentials (e.g., user names, passwords, etc.) in an in-memory database for faster access during processing of a transaction. As an example, and referring again to FIG. 5, at reference number 562, electronic wallet transaction processing system 206 may encrypt and store, during the key setup process, the account identifiers using the wallet public key (e.g., $W_{PK}$, etc.) during the key setup process. In such an example, and referring again to FIG. 6, at reference number 654, electronic wallet transaction processing system 206 may identify or determine an account identifier associated with a user for a transaction based on the user credentials associated with the user without decrypting the encrypted transaction data including the account identifier encrypted with the electronic wallet public key. For example, electronic wallet transaction processing system 206 may look up or determine the account identifier associated with the user credentials in the in-memory database using the user credentials associated with the user.

As shown in FIG. 4, at step 414, process 400 includes authenticating a user for a transaction based on user credentials. For example, electronic wallet transaction processing system 206 may authenticate a user for a transaction based on user credentials. As an example, electronic wallet transaction processing system 206 may authenticate the user for the transaction based on the user credentials received from merchant system 204. In such an example, authenticating the user for the transaction may include re-encrypting the encrypted transaction data with the public re-encryption key and communicating the re-encrypted transaction data to the payment gateway system 208 as described in more detail herein with respect to steps 416 and 418 of FIG. 4.

As shown in FIG. 4, at step 416, process 400 includes re-encrypting encrypted transaction data with a public re-encryption key. For example, electronic wallet transaction processing system 206 may re-encrypt encrypted transaction data with a public re-encryption key. As an example, electronic wallet transaction processing system 206 may re-encrypt the encrypted transaction data with the public re-encryption key. In such an example, and referring again to FIG. 6, at reference number 656, authenticating the user for the transaction may include re-encrypting encrypted transaction data, such as the PAN, and/or the like with the public re-encryption key, for example, a Re-Enc($RK_{W \to PGpk}$, Enc($W_{PK}$, PAN)), and communicating the re-encrypted transaction data to payment gateway system 208. For example, the re-encrypted encrypted transaction data represented as Re-Enc($RK_{W \to PGpk}$, Enc($W_{PK}$, PAN)) may be referred to as a ReToken. Accordingly, non-limiting embodiments or aspects of the present disclosure may avoid reliance on HSM processing during processing of a transaction for decrypting a PAN at electronic payment transaction processing system 206 by using in-memory processing for authenticating a user and a ReToken including the encrypted PAN (e.g., without decrypting the encrypted PAN, etc.) at electronic payment transaction processing system 206, which results in faster transaction processing times (e.g., faster electronic wallet checkout, etc.) and decreased operational overhead.

As shown in FIG. 4, at step 418, process 400 includes communicating re-encrypted transaction data to a payment gateway system. For example, electronic wallet transaction processing system 206 may communicate re-encrypted transaction data to payment gateway system 208. As an example, electronic wallet transaction processing system 206 may communicate the re-encrypted transaction data to payment gateway system 208. In such an example, and referring again to FIG. 6, at reference number 658, electronic wallet transaction processing system 206 may communicate the ReToken to payment gateway 208. Accordingly, non-limiting embodiments or aspects of the present disclosure may break a data flow loop between transaction processing system 206 and payment gateway 208 and reduce communications between the electronic wallet transaction processing system 206 and payment gateway 208 used for authenticating a user for a transaction, which may result in faster transaction processing times and/or faster electronic wallet checkout.

In some non-limiting embodiments or aspects, electronic wallet transaction processing system 206 communicates the re-encrypted transaction data to payment gateway system 208 via a merchant system 204. For example, and referring again to FIG. 6, at reference number 658, electronic wallet transaction processing system 206 communicates the ReToken to payment gateway system 208 via a merchant system 204, which, at reference number 660, forwards the ReToken received from electronic wallet transaction processing system 206 to payment gateway system 208.

In some non-limiting embodiments or aspects, payment gateway system 208 may receive the re-encrypted transaction data, decrypt the re-encrypted transaction data based on the payment gateway secret key, and identify the account identifier. For example, and referring again to FIG. 6, at reference number 662, payment gateway system 208 may decrypt the ReToken using a secret key (e.g., the payment gateway secret key $PG_{SK}$, etc.) as described by Ateniese, G., Fu, K., Green, M., Hohenberger, S. in the paper titled "Improved Proxy Re-encryption Schemes with Applications to Secure Distributed Storage" published in The 12th Annual Network and Distributed System Security Symposium, pp. 29-43 (2005), the entire contents of which is incorporated herein by reference. As an example, decrypting the ReToken may provide or identify the actual or unencrypted PAN and/or PAN data associated therewith to payment gateway system 208.

In some non-limiting embodiments or aspects, and still referring to FIG. 6, at reference number 664, payment gateway 208 may communicate the account identifier (e.g., the PAN, a BIN of the PAN, etc.) to 3D secure provider system 210 to further authenticate the user and/or authorize the transaction with an additional security layer that helps inhibit or prevent unauthorized CNP (Card not present transaction) transactions and protects the merchant from CNP exposure to fraud.

Although embodiments or aspects have been described in detail for the purpose of illustration and description, it is to be understood that such detail is solely for that purpose and that embodiments or aspects are not limited to the disclosed embodiments or aspects, but, on the contrary, are intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect. In fact, any of these features can be combined in ways not specifically recited in the claims and/or disclosed in the specification. Although each dependent claim listed below may directly depend on only one claim, the disclosure of possible implementations includes each dependent claim in combination with every other claim in the claim set.

What is claimed is:

1. A computer-implemented method, comprising:
generating, with a payment gateway, a payment gateway key pair including a payment gateway public key and a corresponding payment gateway secret key, the payment gateway public key and the payment gateway secret key associated with the payment gateway;
communicating, with the payment gateway, to an electronic wallet transaction processing system, the payment gateway public key;
receiving, with the payment gateway, from the electronic wallet transaction processing system, a public re-encryption key generated based on the payment gateway public key, wherein the public re-encryption key is a proxy re-encryption key;
communicating, with the payment gateway, to a merchant system, the public re-encryption key;
receiving, with the payment gateway, from the electronic wallet transaction processing system, re-encrypted transaction data associated with a transaction, wherein the re-encrypted transaction data includes encrypted transaction data including an account identifier encrypted with an electronic wallet public key and re-encrypted with the public re-encryption key, wherein an electronic wallet key pair includes the electronic wallet public key and a corresponding electronic wallet secret key, the electronic wallet key pair associated with the electronic wallet transaction processing system, and wherein a user is authenticated for the transaction by the electronic wallet transaction processing system based on user credentials associated with the user without decrypting the encrypted transaction data including the account identifier encrypted with the electronic wallet public key before the payment gateway receives, from the electronic wallet transaction processing system, the re-encrypted transaction data;
decrypting, with the payment gateway, the re-encrypted transaction data based at least partially on the payment gateway secret key; and
identifying, with the payment gateway, the account identifier.

2. The computer-implemented method of claim 1, wherein the payment gateway receives the re-encrypted transaction data from the electronic wallet transaction processing system via the merchant system.

3. The computer-implemented method of claim 1, further comprising:
communicating, with the payment gateway, to a 3D secure provider system, the account identifier to at least one of further authenticate the user and authorize the transaction with an additional security layer.

4. The computer-implemented method of claim 1, wherein the account identifier includes a primary account number (PAN).

5. A system, comprising:
a payment gateway including one or more processors programmed and/or configured to:
generate a payment gateway key pair including a payment gateway public key and a corresponding payment gateway secret key, the payment gateway public key and the payment gateway secret key associated with the payment gateway;
communicate, to an electronic wallet transaction processing system, the payment gateway public key;
receive, from the electronic wallet transaction processing system, a public re-encryption key generated based on the payment gateway public key, wherein the public re-encryption key is a proxy re-encryption key;
communicate, to a merchant system, the public re-encryption key;
receive, from the electronic wallet transaction processing system, re-encrypted transaction data associated with a transaction, wherein the re-encrypted transaction data includes encrypted transaction data including an account identifier encrypted with an electronic wallet public key and re-encrypted with the public re-encryption key, wherein an electronic wallet key pair includes the electronic wallet public key and a corresponding electronic wallet secret key, the electronic wallet key pair associated with the electronic wallet transaction processing system, and wherein a user is authenticated for the transaction by the electronic wallet transaction processing system based on user credentials associated with the user without decrypting the encrypted transaction data including the account identifier encrypted with the electronic wallet public key before the payment gateway receives, from the electronic wallet transaction processing system, the re-encrypted transaction data;

decrypt the re-encrypted transaction data based at least partially on the payment gateway secret key; and identify the account identifier.

6. The system of claim 5, wherein the payment gateway receives the re-encrypted transaction data from the electronic wallet transaction processing system via the merchant system.

7. The system of claim 5, wherein the payment gateway including the one or more processors is further programmed and/or configured to:

communicate, to a 3D secure provider system, the account identifier to at least one of further authenticate the user and authorize the transaction with an additional security layer.

8. The system of claim 5, wherein the account identifier includes a primary account number (PAN).

9. A computer program product comprising at least one non-transitory computer-readable medium including program instructions that, when executed by at least one processor of a payment gateway, cause the at least one processor to:

generate a payment gateway key pair including a payment gateway public key and a corresponding payment gateway secret key, the payment gateway public key and the payment gateway secret key associated with the payment gateway;

communicate, to an electronic wallet transaction processing system, the payment gateway public key;

receive, from the electronic wallet transaction processing system, a public re-encryption key generated based on the payment gateway public key, wherein the public re-encryption key is a proxy re-encryption key;

communicate, to a merchant system, the public re-encryption key;

receive, from the electronic wallet transaction processing system, re-encrypted transaction data associated with a transaction, wherein the re-encrypted transaction data includes encrypted transaction data including an account identifier encrypted with an electronic wallet public key and re-encrypted with the public re-encryption key, wherein an electronic wallet key pair includes the electronic wallet public key and a corresponding electronic wallet secret key, the electronic wallet key pair associated with the electronic wallet transaction processing system, and wherein a user is authenticated for the transaction by the electronic wallet transaction processing system based on user credentials associated with the user without decrypting the encrypted transaction data including the account identifier encrypted with the electronic wallet public key before the payment gateway receives, from the electronic wallet transaction processing system, the re-encrypted transaction data;

decrypt the re-encrypted transaction data based at least partially on the payment gateway secret key; and identify the account identifier.

10. The computer program product of claim 9, wherein the payment gateway receives the re-encrypted transaction data from the electronic wallet transaction processing system via the merchant system.

11. The computer program product of claim 9, wherein the instructions, when executed by the at least one processor of the payment gateway, further cause the at least one processor to:

communicate, to a 3D secure provider system, the account identifier to at least one of further authenticate the user and authorize the transaction with an additional security layer.

12. The computer program product of claim 9, wherein the account identifier includes a primary account number (PAN).

13. The computer-implemented method of claim 1, wherein the payment gateway generates the payment gateway key pair including the payment gateway public key and the corresponding payment gateway secret key during a key setup process performed before receiving user credentials associated with the account identifier in response to the transaction being initiated, wherein the payment gateway communicates, to the electronic wallet transaction processing system, the payment gateway public key during the key setup process performed before receiving the user credentials associated with the account identifier in response to the transaction being initiated, wherein the payment gateway receives, from the electronic wallet transaction processing system, the public re-encryption key generated based on the payment gateway public key during the key setup process performed before receiving the user credentials associated with the account identifier in response to the transaction being initiated, wherein the payment gateway communicates, to the merchant system, the public re-encryption key during the key setup process performed before receiving the user credentials associated with the account identifier in response to the transaction being initiated, and wherein the payment gateway receives, from the electronic wallet transaction processing system, the re-encrypted transaction data associated with the transaction after the key setup process.

14. The system of claim 5, wherein the payment gateway including the one or more processors is further programmed and/or configured to:

generate the payment gateway key pair including the payment gateway public key and the corresponding payment gateway secret key during a key setup process performed before receiving user credentials associated with the account identifier in response to the transaction being initiated;

communicate, to the electronic wallet transaction processing system, the payment gateway public key during the key setup process performed before receiving the user credentials associated with the account identifier in response to the transaction being initiated;

receive, from the electronic wallet transaction processing system, the public re-encryption key generated based on the payment gateway public key during the key setup process performed before receiving the user credentials associated with the account identifier in response to the transaction being initiated;

communicate, to the merchant system, the public re-encryption key during the key setup process performed before receiving the user credentials associated with the account identifier in response to the transaction being initiated; and receive, from the electronic wallet transaction processing system, the re-encrypted transaction data associated with the transaction after the key setup process.

15. The computer program product of claim 9, wherein the instructions, when executed by the at least one processor of the payment gateway, further cause the at least one processor to:

generate the payment gateway key pair including the payment gateway public key and the corresponding payment gateway secret key during a key setup process performed before receiving user credentials associated with the account identifier in response to the transaction being initiated;

communicate, to the electronic wallet transaction processing system, the payment gateway public key during the key setup process performed before receiving the user credentials associated with the account identifier in response to the transaction being initiated;

receive, from the electronic wallet transaction processing system, the public re-encryption key generated based on the payment gateway public key during the key setup process performed before receiving the user credentials associated with the account identifier in response to the transaction being initiated;

communicate, to the merchant system, the public re-encryption key during the key setup process performed before receiving the user credentials associated with the account identifier in response to the transaction being initiated; and receive, from the electronic wallet transaction processing system, the re-encrypted transaction data associated with the transaction after the key setup process.

* * * * *